United States Patent
Horst

(10) Patent No.: US 6,789,766 B2
(45) Date of Patent: Sep. 14, 2004

(54) CARGO DROP SYSTEM WITH CARGO PARACHUTE AND PROCESS FOR STABILIZATION OF A CARGO DROP SYSTEM BY MEANS OF A CARGO PARACHUTE FOLLOWING THE DROP FROM THE AIRCRAFT

(75) Inventor: Christof Horst, Aying (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/429,259

(22) Filed: May 5, 2003

(65) Prior Publication Data

US 2004/0000618 A1 Jan. 1, 2004

(30) Foreign Application Priority Data

| May 3, 2002 | (DE) | ......................................... 102 19 952 |
| Sep. 7, 2002 | (DE) | ......................................... 102 41 584 |
| Jan. 31, 2003 | (DE) | ......................................... 103 03 788 |

(51) Int. Cl.[7] ................................................ B64D 1/12
(52) U.S. Cl. ............................... 244/137.3; 244/151 B; 244/152
(58) Field of Search .......................... 244/137.1, 138 R, 244/151 R–151 B, 147–150, 152, 137.3

(56) References Cited

U.S. PATENT DOCUMENTS

| 3,257,089 | A | * | 6/1966 | Samms ..................... 244/151 R |
| 3,642,235 | A | * | 2/1972 | Criley et al. .............. 244/137.3 |
| 3,670,999 | A | * | 6/1972 | Leger ....................... 244/137.3 |
| 3,724,788 | A | * | 4/1973 | Petry et al. ............... 244/137.3 |
| 3,801,051 | A | * | 4/1974 | Hosterman et al. ....... 244/137.3 |
| 4,342,437 | A | * | 8/1982 | Farinacci ................. 244/137.3 |
| 5,816,535 | A | * | 10/1998 | Underwood et al. ..... 244/137.3 |

* cited by examiner

Primary Examiner—Galen Barefoot
(74) Attorney, Agent, or Firm—Crowell & Moring LLP

(57) ABSTRACT

Cargo drop system and process (1) with a cargo (2), a cargo parachute (6) and an auxiliary parachute (7), which, by means of at least one ripcord (12; 12a, 12b), connects the auxiliary parachute (7) to the cargo glide chute (6), whereby a stabilization harness (14; 14a, 14b) is connected to the ripcord (12; 12a, 12b) on one side and to the cargo (2) on the other side, in order to attain a stable position of the cargo (2) relative to the ripcord (12; 12a, 12b), which is pulled by aerodynamic forces after the drop. A first trigger device (20) is provided for the release of the stabilization harness (14; 14a, 14b), and a second trigger device (40) is provided for the release of the cargo parachute (6) from the cargo (2), so that the cargo (2) hangs from a hanging device (60) on the cargo parachute (6).

20 Claims, 22 Drawing Sheets

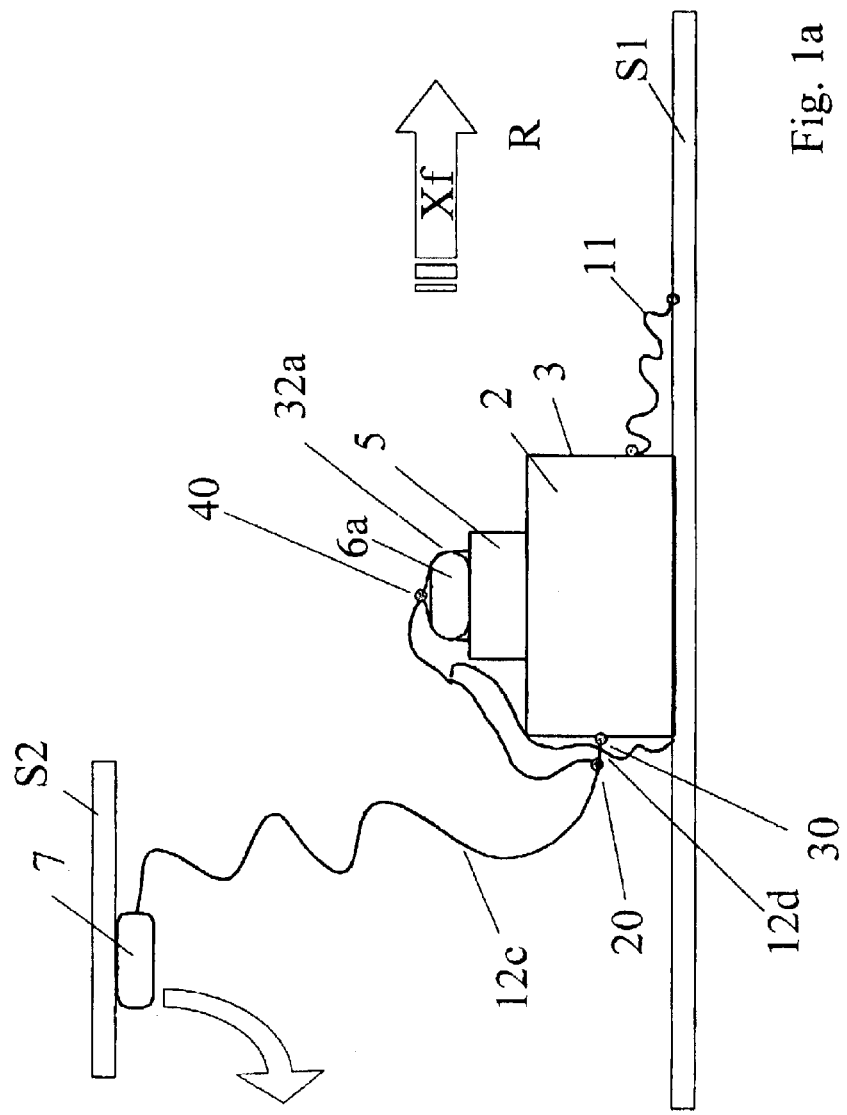

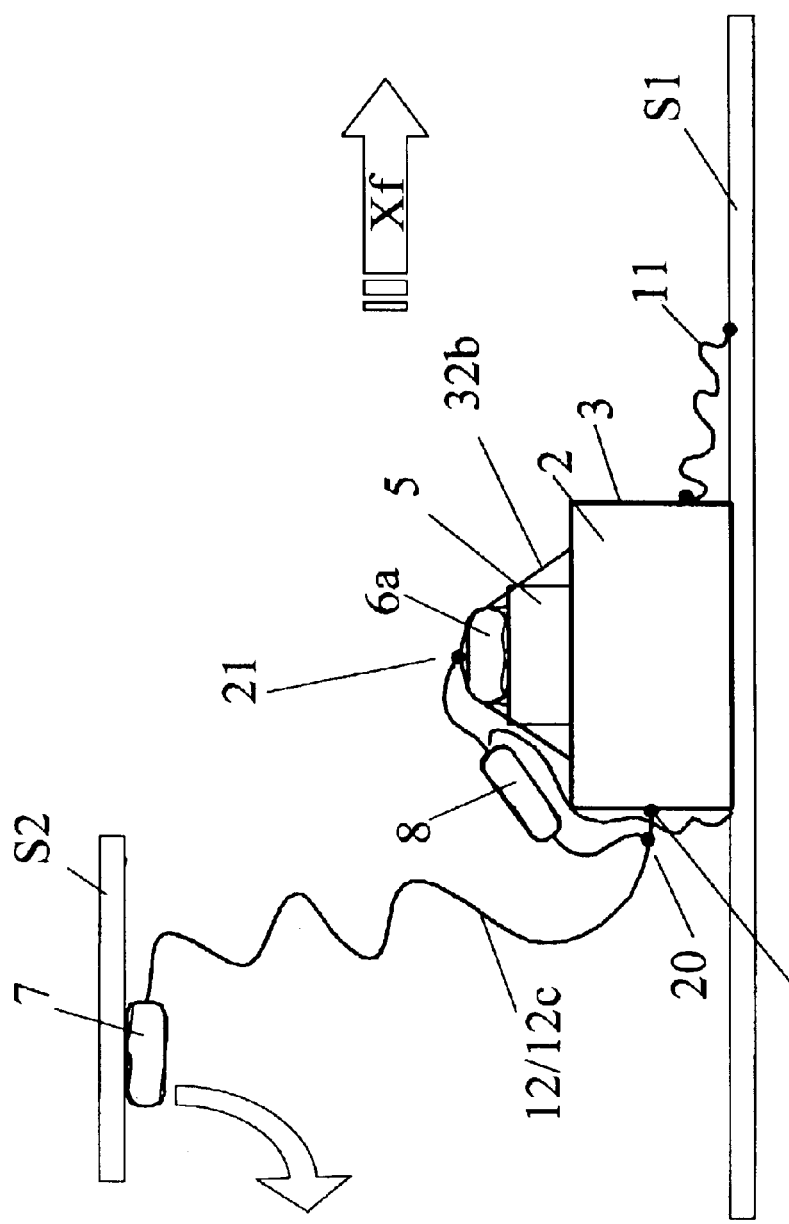

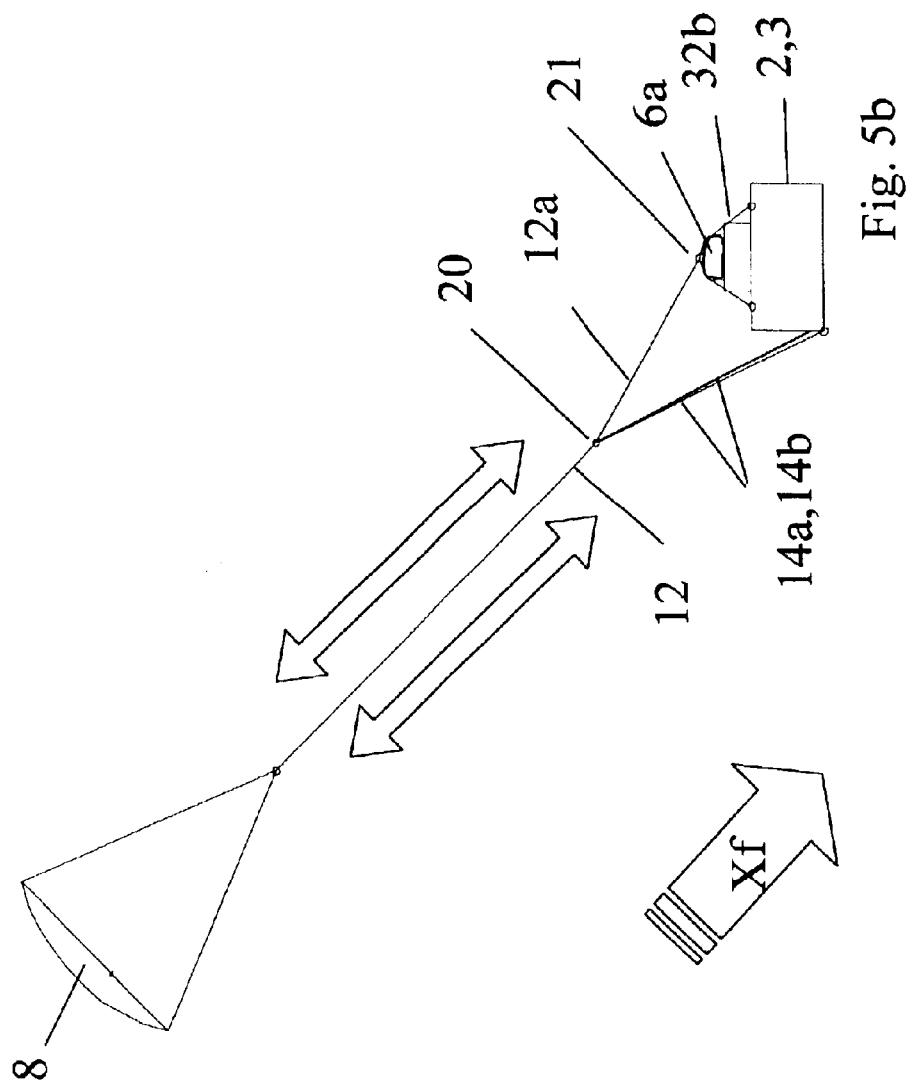

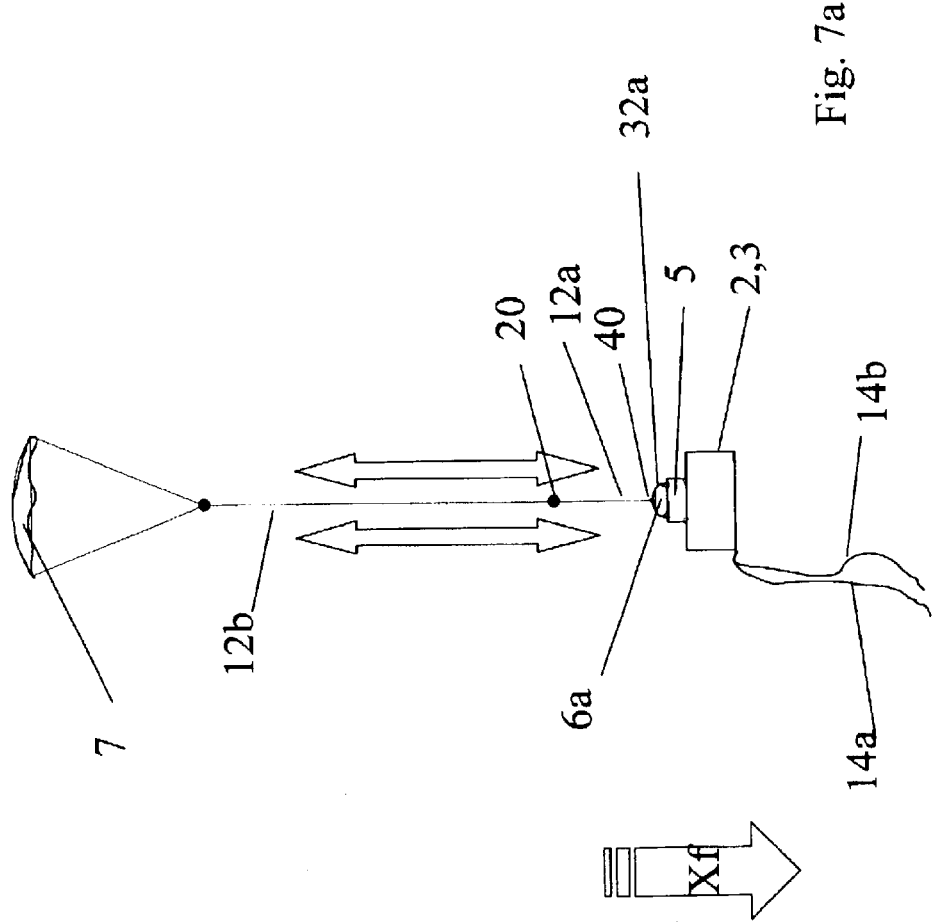

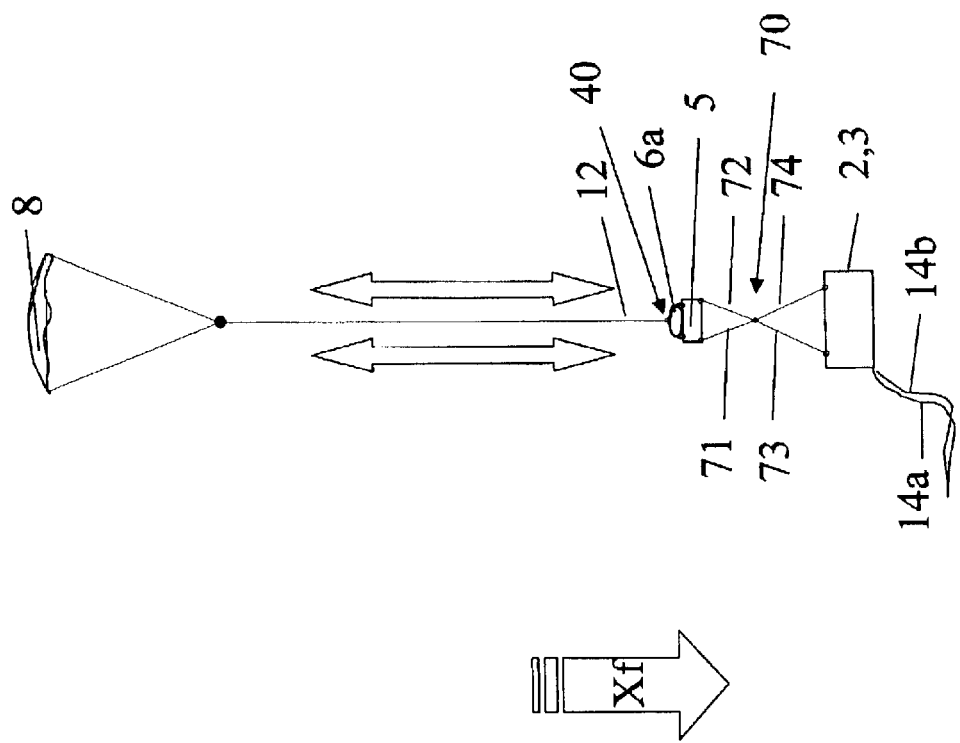

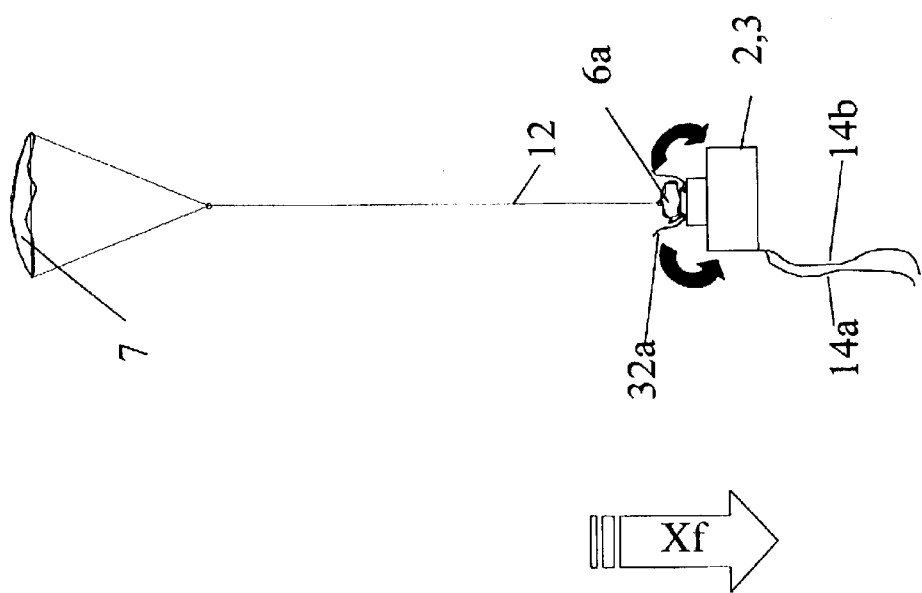

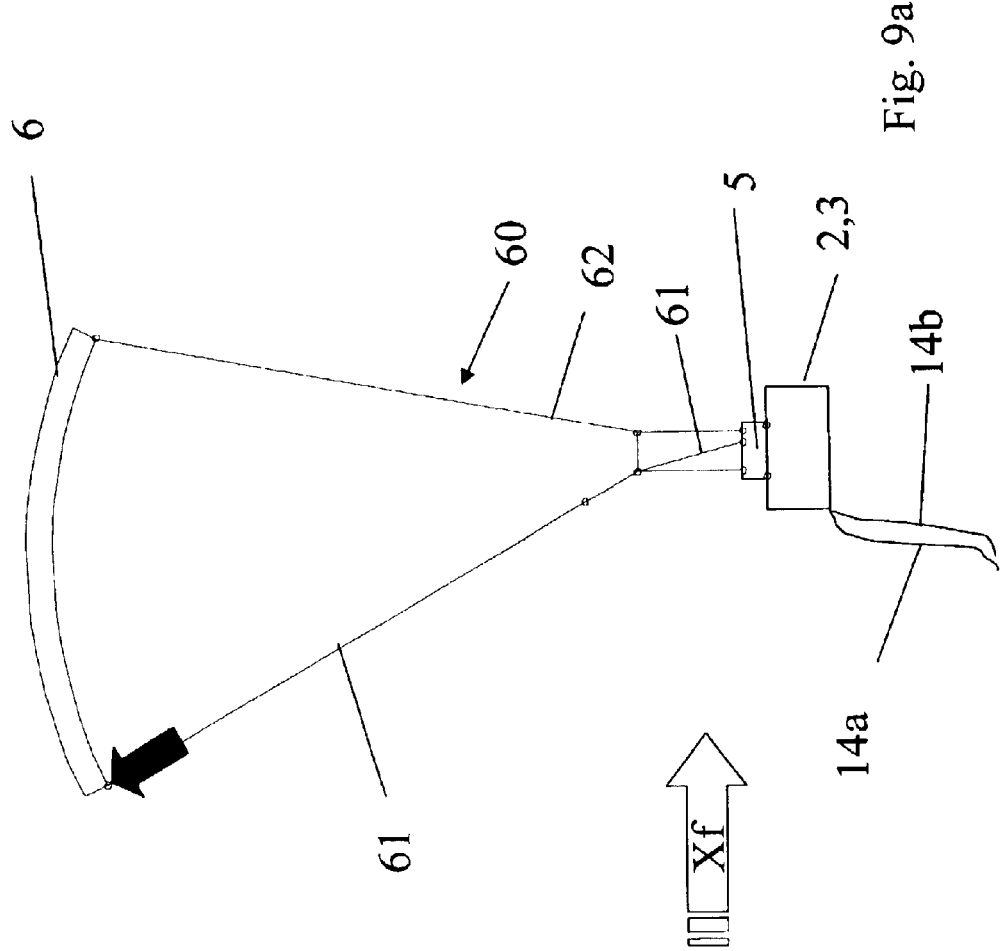

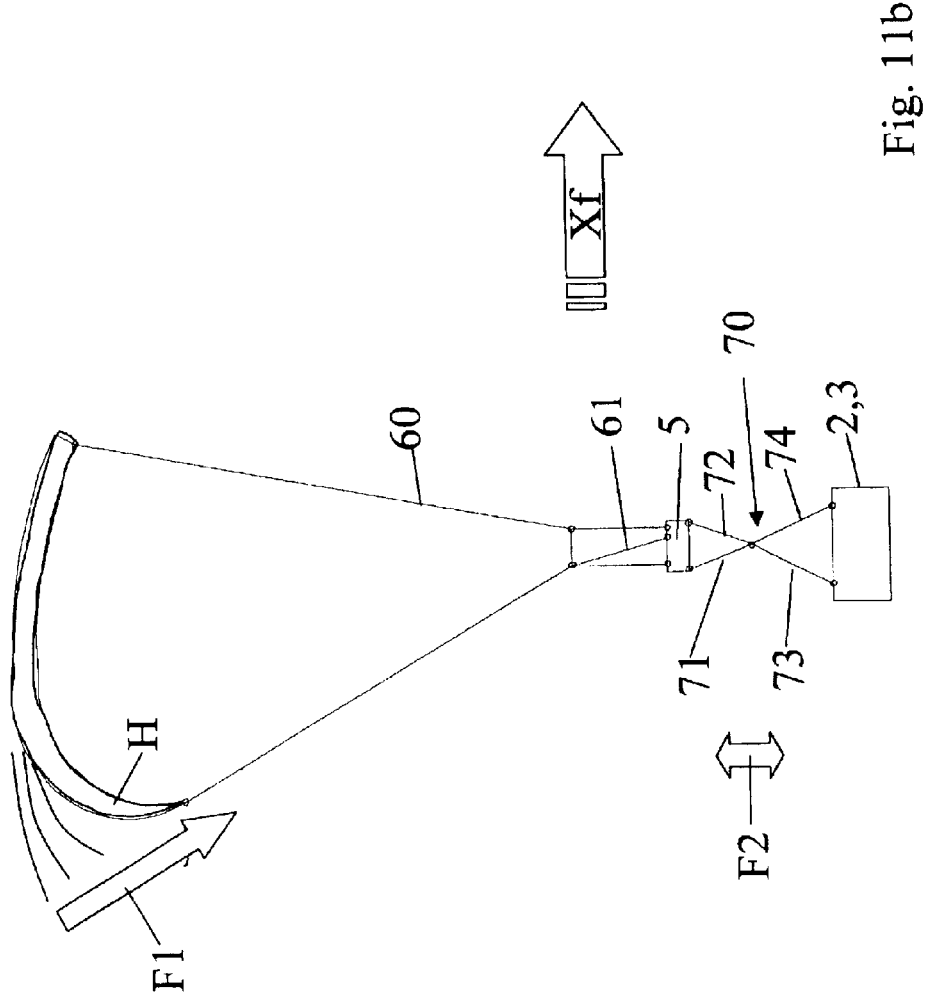

CARGO DROP SYSTEM WITH CARGO PARACHUTE AND PROCESS FOR STABILIZATION OF A CARGO DROP SYSTEM BY MEANS OF A CARGO PARACHUTE FOLLOWING THE DROP FROM THE AIRCRAFT

BACKGROUND AND SUMMARY OF THE INVENTION

This application claims the priority of German Application No. 102 19 952.3, filed May 3, 2002, and German Application No. 102 41 584.6, filed Sep. 7, 2002 and German Patent Application No. 103 03 788.8, filed Jan. 31, 2003, the disclosures of which are expressly incorporated by reference herein.

The invention concerns a cargo drop system with a cargo parachute, for the dropping of a cargo from an aircraft, as well as a process for the stabilization of a cargo drop system by means of a cargo parachute, following the drop from the aircraft.

Although auxiliary parachutes used to parachute cargo are known from prior art the present invention addresses the stabilization problem still remaining after using the prior art devices.

Accordingly, the objective of the invention is to set forth a process by means of which the former processes can be improved. In addition, the objective of the invention is to set forth a suitable device and a cargo drop system for the implementation of this process.

According to the invention, a cargo drop system is connected to a cargo or a cargo holding device, with a cargo parachute and with an auxiliary parachute, which, by means of at least one ripcord, connects the auxiliary parachute with the cargo glide chute. A stabilization harness serves to connect a connection point on the ripcord with a fastening device on the cargo or the cargo holding device, in order, in a taut condition, to stabilize the cargo in a predetermined position relative to the ripcord, which is pulled by aerodynamic forces, and to maintain the angle, which is formed by the vertical axis of the cargo relative to the longitudinal projection of the ripcord, which is pulled by aerodynamic forces after the drop, within a predetermined range of angles. A first trigger device is provided for the release of the stabilization harness, and a second trigger device is provided for the release of the cargo parachute from the cargo, so that the cargo hangs from a hanging device on the cargo parachute.

The first and second trigger devices can be actuated through the attainment of a predetermined tension in the ripcord, and the use of time delay devices. The time delay device of the first trigger device can be configured in such a way that the release of the stabilization harness takes place within a time interval between 2 and 6 seconds after the attainment of the predetermined tension in the ripcord. The time delay device of the second trigger device can be configured in such a way that the opening of the glide chute takes place within a time interval between 3 and 12 seconds after the attainment of the predetermined tension in the ripcord. By means of an uncoupling device, which cooperates with an uncoupling line connected to the fuselage of the aircraft and that connects a location on the ripcord with the cargo in a detachable manner, the stabilization harness can be kept in a slack condition, whereby, by releasing the uncoupling line from the cargo, the ripcord is released from its fastening point, so that, by means of the aerodynamic forces, the stabilization harness, together with the entire ripcord, can be brought into a taut condition.

Furthermore, the control unit, as well as an additional trigger device for the release of fastening devices, can be located, in a detachable manner, on the cargo or the cargo holding device, in order to accomplish the release of the control unit, whereby the cargo hangs from a suitable hanging device on the control unit.

According to the process of the invention for stabilization of a cargo drop system, which drops cargo from an aircraft, a cargo or a cargo holding device, provided with a cargo parachute and an auxiliary parachute, as well as at least one ripcord which connects the auxiliary parachute with the cargo glide chute, whereby:

- an auxiliary parachute is dropped from the aircraft;
- a first trigger device is activated, in order to bring a stabilization harness that is connected to the ripcord, through the effects of the aerodynamic forces, into a taut condition; and
- a second trigger device is activated, in order to release the packed cargo parachute from the cargo, so that the cargo hangs from a hanging device on the cargo parachute.

Other objects, advantages and novel features of the present invention will become apparent from the following detailed description of the invention when considered in conjunction with the accompanying drawings.

BRIEF DESCRIPTION OF THE DRAWINGS

The invention is described in greater detail below, by means of the figures attached hereto, wherein:

FIG. 1a is a schematic representation of a design of the cargo drop system according to the invention, still within an aircraft, and intended for dropping cargo therefrom, whereby the cargo drop system, as represented, exhibits an auxiliary parachute and a cargo parachute, FIG. 1b is a schematic representation of an additional design of the cargo drop system according to the invention, prior to the drop from the aircraft, whereby the cargo drop system, as represented, exhibits a first auxiliary parachute, an additional auxiliary parachute and a cargo parachute, FIG. 5b illustrates the cargo drop system as shown in FIG. 1b in a phase in which the second auxiliary parachute is open and the stabilization harness stabilizes the cargo, FIG. 7a shows the cargo drop system as shown in FIG. 1a in an additional phase in which the stabilization harness is released through the activation of a first trigger device, whereby a design of the cargo drop system is shown in which the control unit, following the activation of the first trigger device, remains on the cargo, FIG. 7b illustrates the cargo drop system as shown in FIG. 1b in an additional phase in which the stabilization harness is released, through the activation of a first trigger device, whereby a design of the cargo drop system is shown in which the control unit, following the activation of the first trigger device, is distanced from the cargo by means of a cargo hanging device, FIG. 8a illustrates the cargo drop system as shown in FIG. 1a and/or FIG. 7a in a design, in which the control unit, following the activation of the first trigger device, remains on the cargo, and, in an additional phase, in which, through the activation of a second trigger device, the cargo parachute is released from the cargo and is thereby free to open, FIG. 9a shows the cargo drop system as shown in FIG. 1a and/or FIG. 7a in an additional phase, in which, through the activation of a second trigger device, the cargo parachute is opened, FIG. 11b illustrates the cargo drop system as shown in FIG. 1b and/or FIG. 7b in an additional phase, in which, prior to landing, through the activation of an actuator, which makes use of the force of gravity of the cargo, a flare is set off.

DETAILED DESCRIPTION OF THE PREFERRED EMBODIMENTS

Figure 2A:
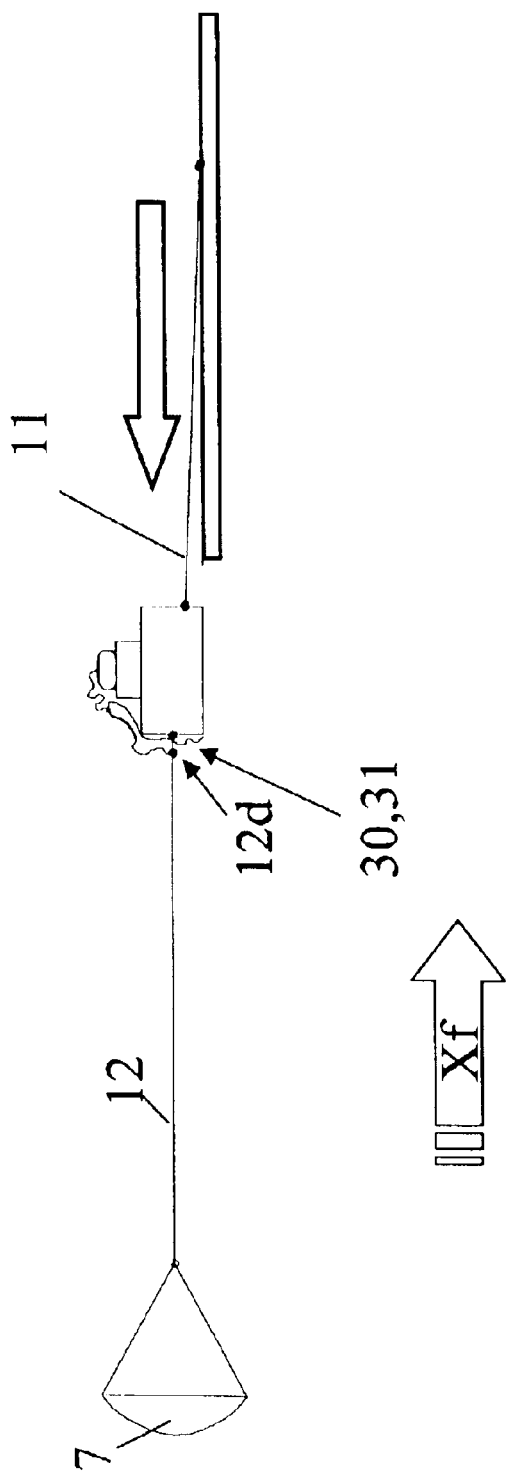
FIG. 2a shows the cargo drop system as shown in FIG. 1a, just after the drop from the aircraft, whereby the auxiliary parachute is already open and an uncoupling device, for the release of the stabilization harness by means of an uncoupling line, is not yet activated.

The cargo drop system 1 shown in the figures includes a cargo 2 to be transported, an optional cargo holding device 3 for holding said cargo, an optional control unit or control box 5, at least one cargo parachute 6, which can be configured as a glide chute or as a parachute, and which is also referred to hereinafter, for the sake of brevity, as a "glide chute", and at least one auxiliary parachute or braking parachute 7, whereby the cargo parachute or glide chute 6 hangs from the auxiliary parachute 7. Optionally, in an additional design of the invention, an additional auxiliary parachute 8 can also be present, which similarly hangs from the (first) auxiliary parachute or braking parachute 7 (FIG. 1b). In a further design, the auxiliary parachute 8, in essence, fulfills the function of a drogue parachute, hereinafter referred to as a "drogue". In a design of the invention in which there is no additional auxiliary parachute 8, the auxiliary parachute 7, which is thus the only auxiliary parachute, fulfills the function of both a drogue chute and a braking/stabilizing parachute, in a subsequent drop phase. FIG. 1a shows a design of the cargo drop system 1 according to the invention, in which not one drogue chute and one braking chute, but simply one auxiliary parachute 7 is shown, which fulfills the function of both a drogue chute and a braking parachute. FIG. 1b shows a design of the cargo drop system 1 according to the invention with a first auxiliary parachute 7 and a second auxiliary parachute 8 or an independent drogue chute 8, which is also provided in addition to the first auxiliary parachute 6. In this design, the first auxiliary parachute 7, in essence, fulfills the function of a drogue chute and the second auxiliary parachute 8, in essence, fulfills the function of a braking and stabilizing parachute. Basically, in addition to these components of the cargo drop system 1 according to the invention, additional auxiliary parachutes may be provided. Especially, an auxiliary parachute 7 or 8, or even a cargo parachute 6, may comprise several parachutes, thus constituting a parachute system. In the following description, wherever "a parachute"—which may be an auxiliary parachute 7 or 8, or a cargo parachute 6—is mentioned, the intention can always include a parachute system or an arrangement of several parachutes. The several connection lines, which are required whenever several parachutes are used, can then be attached together at the provided fastening points or at other points.

In the following description, reference will be made to a "three-stage design" of the cargo drop system 1 according to the invention, in cases where an additional auxiliary parachute 8 or an additional auxiliary parachute arrangement 8 is provided, whereas reference will be made to a "two-stage design" in cases where this/these auxiliary parachute(s) is/are not provided. According to the invention, more than this number of stages may also be used. In such a case, several first auxiliary parachutes or first auxiliary parachute arrangements 7 (cf. FIGS. 3a, 3b would be used.

The control unit 5 can include an actuator for the control of the glide chute by means of the control lines, as well as a navigation and guidance system and a mission planning system, whereby the mission planning system determines a nominal flight path and transfers it to the navigation and guidance system, and whereby the navigation and guidance system includes a set of sensors to determine the actual position of the glide chute system and functions for determination of the momentary deviation of the glide chute system from the nominal flight path and for coordination of control commands, which are transmitted by way of signal lines to the actuator, in order to minimize the deviation of the glide chute system from the nominal flight path.

On the cargo 2 or the cargo holding device 3, an unlocking line 11, which is connected to the structure—for example, the dropping ramp, or a louver or the floor or a structural component S1 of the cargo bay R, can be provided prior to the drop.

Figure 3A:
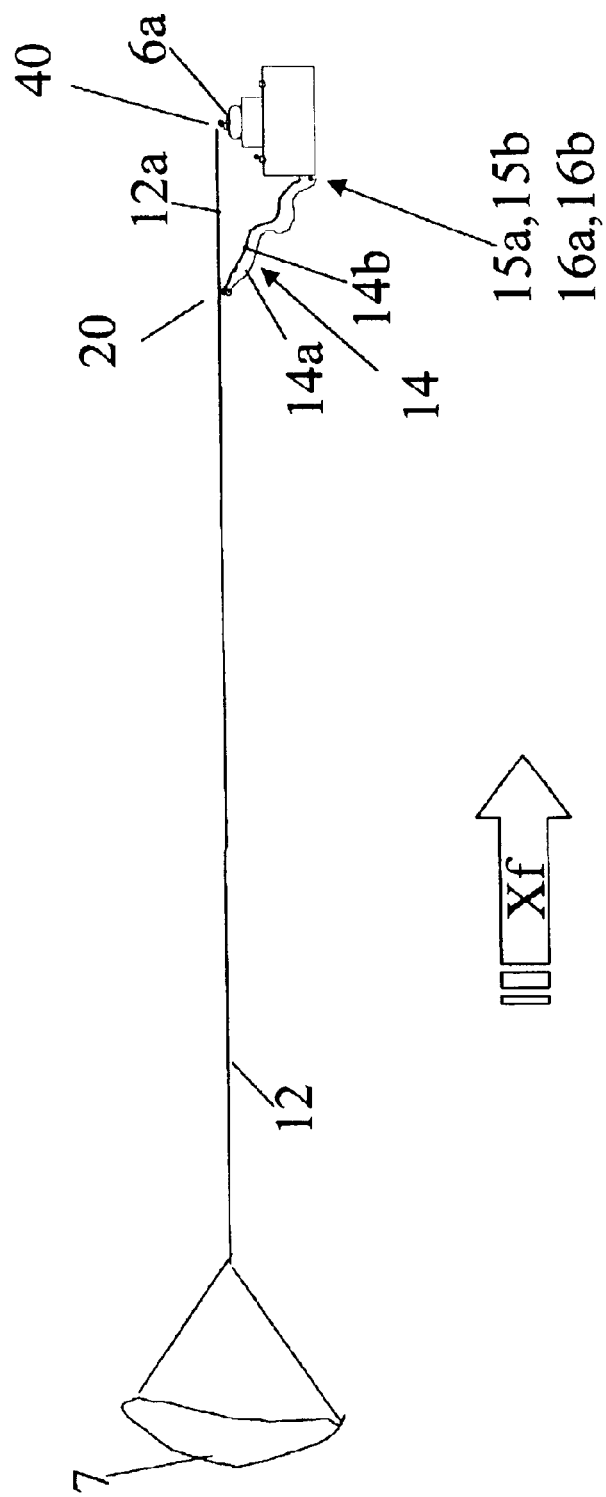
FIG. 3a shows the cargo drop system as shown in FIG. 1a in a phase in which the auxiliary parachutes open and the uncoupling device, for the release of the stabilization harness by means of the uncoupling line, is activated.
Figure 3B:
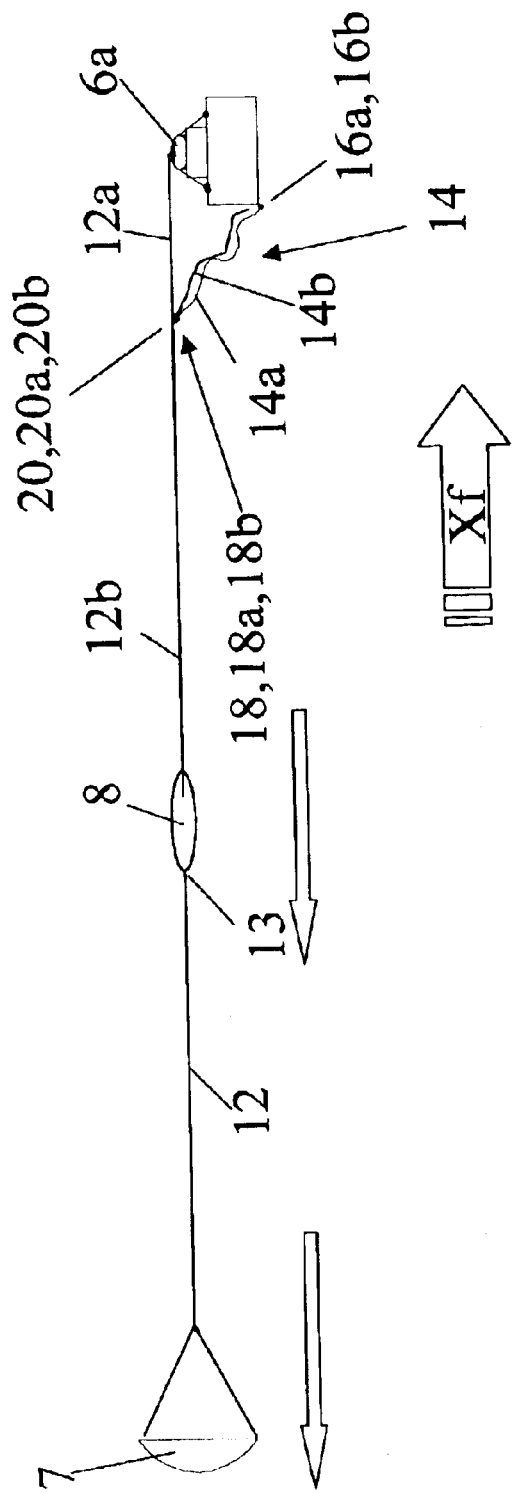
FIG. 3b shows the cargo drop system as shown in FIG. 1b in a phase in which the auxiliary parachutes open and the uncoupling device, for the release of the stabilization harness by means of the uncoupling line, is activated, so that the additional auxiliary parachute is also released from the cargo.
Figure 4:
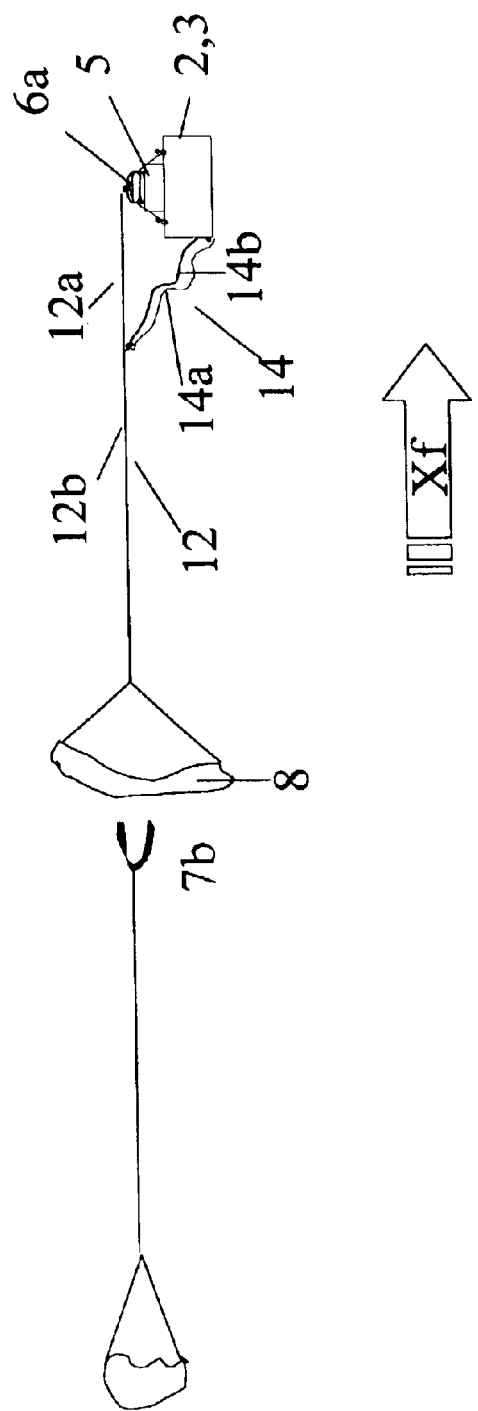
FIG. 4 shows the cargo drop system as shown in FIG. 1b in a phase subsequent to the phase shown in FIG. 3b, in which the first auxiliary parachute, through the action of aerodynamic forces, is released from the second auxiliary parachute.

The auxiliary parachute 7 is connected to the cargo parachute 6—via the second auxiliary parachute 8, where applicable—by means of a ripcord 12. The ripcord 12 can consist of one or more parts. In addition, the cargo drop system 1 includes a stabilization harness 14 in the form of at least one stabilization line 14, which, in connection with the ripcord 12, ensures a predetermined position of the cargo glide chute in the flight phase shown in FIGS. 5a/5b. Each of FIGS. 3a and 3b shows a design of the cargo drop system 1 with two stabilization lines 14a, 14b, which, for the purpose of exercise of their stabilization function, are located under the ripcord 12 (FIGS. 3a, 3b, 4). The stabilization harness 14 is, or the two stabilization lines 14a, 14b are fastened at their first end 15a, 15b, to suitable fastening devices 16a, 16b on the cargo 2 or the cargo holding device 3, and, at their second end 18a, 18b, to one or more fastening devices or connection points 20 or 20a, 20b on the ripcord 12.

The stabilization harness according to the invention can be arranged in other ways. What is significant is that it, together with the ripcord 12, takes up the turning moments which are forced through the effect of aerodynamic forces on the cargo 2 or the cargo holding device 3. Because the ripcord 12 is connected, via the packed cargo parachute 6a, to the control unit 5 and/or to the cargo 2 or the cargo holding device 3, the possible location of the fastening point of the stabilization harness 14 is functionally dependent on the location at which the tension force exercised in-flight by the ripcord 12 acts upon the cargo 2 or the cargo holding device 3. When this point of contact, for example, is located on the underside of the cargo 2 or the cargo-holding device 3 (approximately at location 16), it is advantageous to attach the stabilization harness 14 above this point. On the basis of this example, it may be understood that the point of contact of the ripcord 12, and thus also the position of the packed cargo parachute 6a, in the drop phase shown in FIGS. 4a and/or 4b, can also be located on the front of the cargo 2 or the cargo holding device 3, when viewed in the flight direction XF.

Advantageously, the cargo 2 is stabilized by means of a three-point hanging arrangement. This can be achieved, as is shown in the designs according to the figures, by means of two stabilization lines 14a, 14b and a partial piece 12a of the ripcord 12. However, it would also be conceivable to accomplish this by means of one stabilization line 14 and two branches of the ripcord 12, which either run directly from one of the auxiliary parachutes 7, 8 or from the one auxiliary parachutes 7, or branch off from the ripcord 12, which branches off from said auxiliary parachute(s).

A line—thus, for example, a ripcord or stabilization line—can be implemented in various ways, according to the state of the art, for example, as a strap or cord.

The connection of the stabilization harness 14 with the ripcord 12 can be accomplished by means of a common "carabiner connection" or in other ways. The connection point can be located directly on the ripcord 12 or on a connection piece which branches off from the ripcord 12. In the following it is referred to a single fastening device 18. The connection of the ripcord 12 from the fastening device 18 to the cargo parachute 6 is implemented by means of a section 12a, which similarly cooperates, in at least one phase of the drop, in order to stabilize the cargo in a predetermined position. In this connection, the section 12a, together with a section 12b, which runs from the connection point 18 to the auxiliary parachute 7 or 8, can be made in one or two parts.

In the represented design of the cargo drop system according to the invention, a connection point of the ripcord 12: 12a, 12b is connected to a connecting member 12d, which is coupled, in a detachable manner, to the cargo 2 or the cargo holding device 3. This connection point can be separate from the fastening point 18 for the stabilization harness 14.

For the release of the stabilization harness 14 or the stabilization lines 14a, 14b from the ripcord 12 and/or from the cargo 2 or the cargo holding device 3, a trigger device 20 is provided. This, for example, can be located at the connection point 18/18a, 18b, or at the connection points 14a, 14b, or between them on the stabilization lines.

A section of the ripcord 12, which, in the phase shown in FIGS. 2a and/or 2b, connects the auxiliary parachute 7 and the cargo parachute 6, possibly by means of an additional auxiliary parachute 8, exhibits a location 31, at which it is connected, in a detachable manner, with an uncoupling device 30, to the cargo 2 or the cargo holding device 3.

In cases where an additional auxiliary parachute 8 is provided, an additional ripcord 12c connects the additional auxiliary parachute 8 with the first auxiliary parachute 7. The additional ripcord 12c can also be connected to and disconnected from the cargo 2 or the cargo holding device 3 by means of an uncoupling device 30 and, optionally, a connection piece 12d. Upon the disconnection of the ripcord 12c from the cargo 2 or the cargo-holding device 3, the connection of this part of the ripcord 12c to the cargo parachute package 6a (where applicable, via an additional auxiliary parachute 8) is retained. The uncoupling device 30 can function together with a time delay device—that is, after the initiation of the uncoupling device 30, a predetermined interval of time must elapse before the actual uncoupling can take place. The time delay function can also be dispensed with.

The initiation or activation of the uncoupling device 30 takes place by means of the release of the uncoupling line 11—preferably through the attainment of a predetermined tension, which occurs when the cargo 2 has left the cargo bay of the aircraft and is pulled away from the fuselage through the action of the aerodynamic forces. The functional connection between the release of the uncoupling line 11 and the initiation or activation of the uncoupling device 30 can take place by means of a mechanical coupling or in other ways. In case of a mechanical coupling, this can be accomplished by means of a line which partially surrounds the cargo 2 or the cargo-handling device 3, whereby said line connects the fastening point 11a of the uncoupling line 11, or the uncoupling line 11 itself, to the uncoupling device 30. When the uncoupling line 11 pulls the partially surrounding line with sufficient tension, as a result of the aerodynamic forces, the partially surrounding line, with a suitable degree of force, pulls on the uncoupling device 30, which, when a certain nominal force is achieved, is released or opened.

In the three-stage design, within the ripcord 12c which connects the first auxiliary parachute 7 and the second auxiliary parachute 8, a nominal separation point 13 is provided, which, when a predetermined tension occurs in the ripcord 12c, is released, so that the first auxiliary parachute 7 is released from the second auxiliary parachute 8. This, in the three-stage design, takes place precisely when the ripcord 12 or 12c with 12b is pulled in the three-stage design (FIGS. 1b, 2b, 3b, 4b) and the aerodynamic forces bring about the predetermined tension in the ripcord 12c.

In the three-stage design, and in the alternative two-stage design of the cargo drop system 1 according to the invention, in which only one auxiliary parachute 7 is provided, the uncoupling device 30, which is located on the cargo 2 or the cargo holding device 3, together with the fastening member 12d and the uncoupling line 11, is optional and can be dispensed with. In this case, the ripcord 12 would be pulled directly after the drop from the aircraft, through the effect of the aerodynamic forces, and the stabilization harness 14 would be tightened. In the two-stage design, a separation point similar to separation point 13 in the three-stage design is not provided.

Uncoupling by means of the uncoupling device 30, as an alternative to activation following the attainment of a predetermined tension, can also be activated by other types of circuits—for example, a time circuit or a signal transmitter. This functional coupling, for example, can also take place through an electrical circuit or by means of the transceiver device. It is especially possible to have a design of the type shown in FIGS. 1b and/or 2b, in which an uncoupling device 30 is provided, which cooperates with the uncoupling line 11 immediately after the drop from the aircraft.

The first trigger device 20 serves to release the stabilization harness 14 from the cargo 2 or the cargo holding device 3 or from a corresponding section of the ripcord 12 or the separation points of the stabilization lines 14a, 14b of the stabilization harness 14, at predetermined points in time or within predetermined time intervals. The times and/or time intervals can be determined in advance or manually or automatically set during the process. Preferably, the first trigger device 20 is activated or initiated when a predetermined amount of tension or tensile force occurs in a certain area of the ripcord 12, so as to separate or release the stabilization harness 14 after a preset interval of time.

The first trigger device 20, for example, can include an ignition device, which activates contacts when a predetermined amount of tension or tensile force occurs in a certain area of the ripcord 12 when a predetermined amount of tension or tensile force occurs there. This can be achieved by locating the contacts in a pre-stressed position, at intervals from each other. The activation ignites an ignition fuse. The ignition fuse is burnt through, along a predetermined length, a predetermined time after the tension occurs, whereupon, by means of a suitable mechanism, an activation device for the release or separation of the stabilization harness 14 is activated. The predetermined time varies in the range between 1 second and 8 seconds, as a function of the composition and weight of the cargo 2, and preferably in the range between 2 and 6 seconds after initiation—that is, after the first (or the only) auxiliary parachute 8, the ripcord 12 is placed under appropriate pressure.

The activation device can be a cutting device, for example, one provided with a folding knife, or another type of device, for example, one provided with a carabiner.

The initiation of the trigger device 20 can also be implemented by means of a suitable set of sensors, and the time delay for the subsequent activation of the activation device by means of a timer.

The trigger device 20 can also be accomplished by means of a suitable electrical device, for example, a time circuit, which, by means of the tension in the ripcord 12, initiates the time delay for the subsequent activation of the activation device.

Figure 6A:
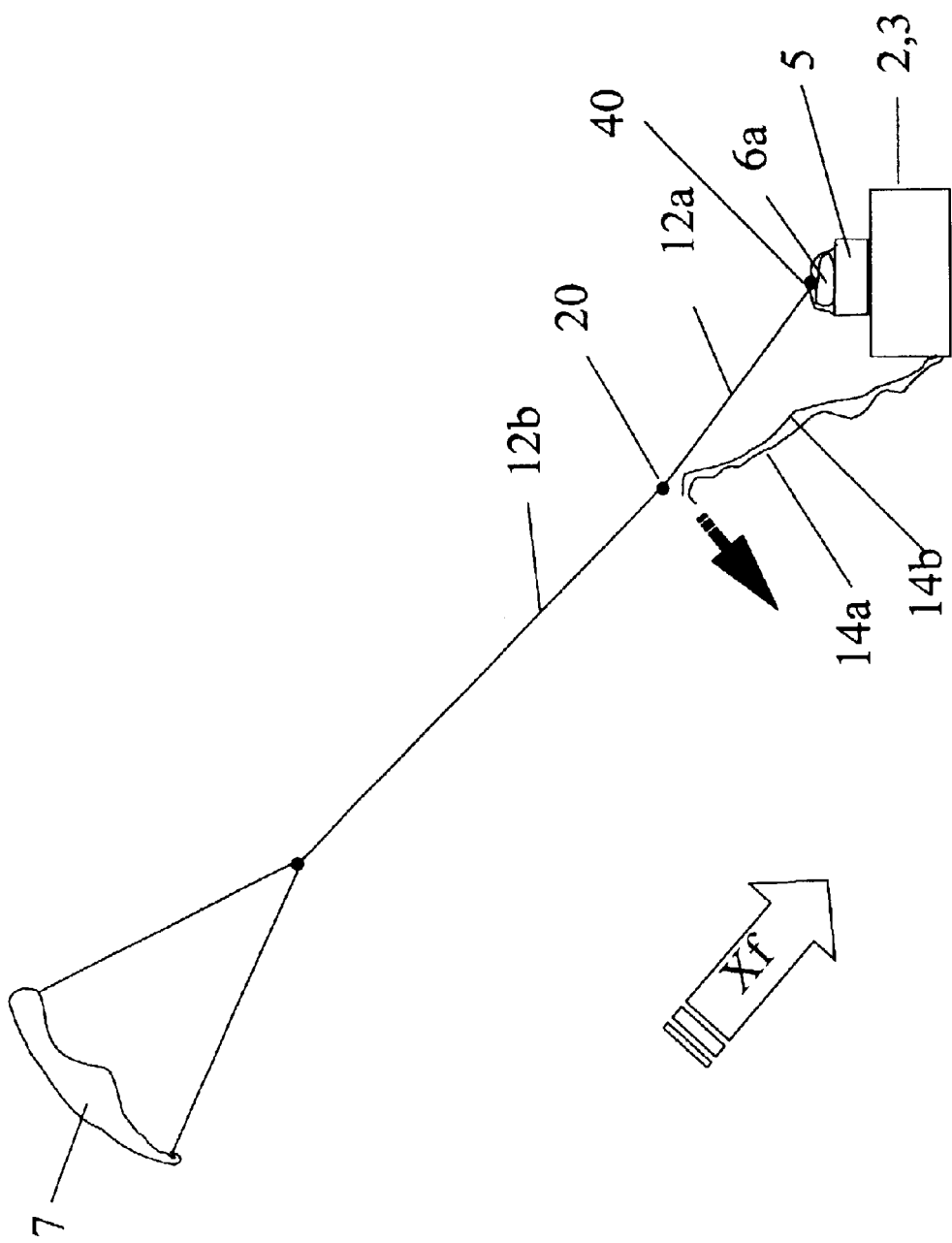
FIG. 6a shows the cargo drop system as shown in FIG. 1a in a phase in which the stabilization harness is released through the activation of a first trigger device.
Figure 6B:
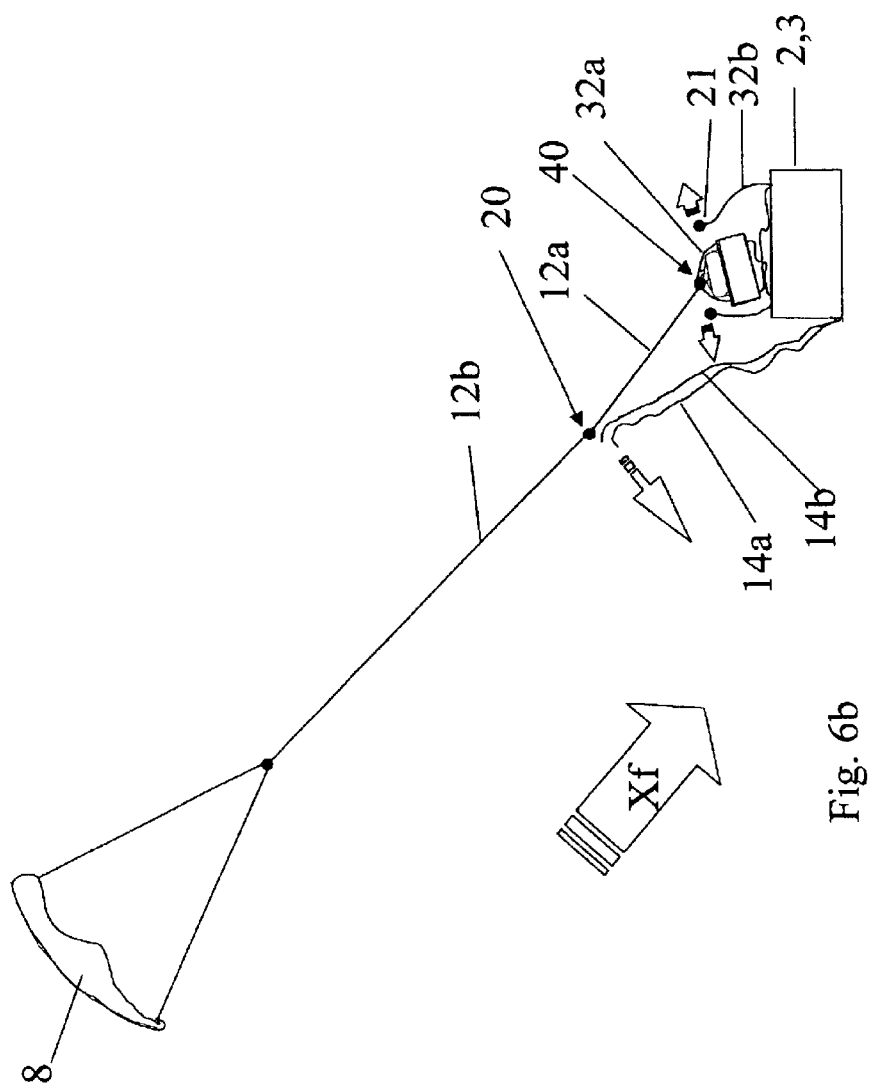
FIG. 6b illustrates the cargo drop system as shown in FIG. 1b in a phase in which the stabilization harness and an additional hanging device are released through the activation of a first trigger device, so that the control unit is released from the cargo.

In a variant, in which the control unit 5 is detachably located on the cargo or the cargo holding device (FIG. 6b), an additional trigger device 21 is activated, which releases fastening device 32b in order to accomplish the release of the control unit 5. Following the release of the control unit 5, the cargo 2 or the cargo holding device 3 hangs, by means of a suitable hanging device 70, from the control unit 5. The trigger device 20 can also include the function of an additional trigger device 21. Preferably, in such a case, a trigger device 20 or an additional trigger device 21 is provided for each of these functions, and said trigger devices are simultaneously or consecutively activated. In the case of consecutive (time-shifted) activation, the additional trigger device 21 is preferably activated at an interval between 0 and 5 seconds after the additional trigger device 21. This time-shifted activation of the two trigger devices 20, 21 can be functionally interrelated or functionally independent of each other. In the former case, and electrical, electronic or mechanical coupling between the two additional trigger devices could exist. In the second case, each of the two additional trigger devices 20, 21 transmits the relevant time reference independently.

Through the release of the additional trigger device 21, the hanging device or cargo harness 70 is brought into the carrying position, and preferably into the X-position, and a distance is created between the control box 5 and the cargo 2.

For implementation of the time delay and the activation device, components according to the state of the art can be used. The time delay can also be implemented by means of a molten wire safety device. The activation device can also include a pre-stressed pin that is activated by a power element and activates a cutting device.

The stabilizing harness 14 prevents the cargo 2 from going into oscillation at an early stage of the drop process. The trigger mechanism 20, at a certain phase, accomplishes the drop process according to the invention, by uncoupling the stabilizing harness 14, after a predetermined time, from the cargo 2 or the cargo handling device 3 and tilting the cargo or the cargo-handling device at an angle within a predetermined range.

The cargo parachute 6, in its packed form 6a, is fastened to the control unit 5, during the early phase of the drop process, by means of a fastening device 32a. The detachability of the fastening device 32 is accomplished by means of a second trigger device 40, by triggering or opening a lock or separating appropriate lines.

The activation or initiation of the second trigger device 40 preferably takes place in a similar manner to that of the first trigger device 20, by the exertion of a predetermined tension or tensile force on the ripcord 12. According to the invention, the triggering or separation takes place in the time interval between 3 and 12 seconds, and preferably between 5 and 8 seconds, after the exertion of the predetermined tension on the ripcord 12, and, in any case, following the release of the stabilization harness 14.

The time of the activation of the first trigger device 20—and of the additional trigger device 21, if present—as well as that of the second trigger device 40, and the separation of the stabilization harness 14 or the fastening device 18 or 16, can also be determined on the basis of the time of the drop from the aircraft plus a predetermined time difference, whereby said time difference can be anywhere between 1 and 10 seconds, and preferably between 2 and 5 seconds. The time difference can especially be 3 seconds. In an alternative design of the cargo drop system 1, it is also possible to make use of an absolute time, which is determined by the navigation and guidance computer or by an external station—that is, an on-board station or ground station—or by the mission planning system. In these cases, the trigger device 20 would have to exhibit a suitable circuit.

In such a design, with the first and second trigger mechanisms, both of said mechanisms could maintain a data connection with the navigation and guidance system or with the mission planning system.

A fastening device 32, along with the cargo parachute, can also hold the control unit 5 against the cargo 2 or the cargo-handling device 3, even if it is not rigidly attached thereto (FIG. 1*b*). If the control unit 5 is rigidly attached to the cargo 2 or the cargo-handling device 3, the fastening device 32*a* can also hold the packed cargo parachute 6*a* to the control unit 5, or to the cargo 2 or the cargo-handling device 3.

Thus, according to the invention, the cargo drop system 1 includes a first trigger device 20, an additional trigger device 21 (if present), and a second trigger device 40, which can maintain a data connection with the navigation and guidance system or with the mission planning system, or with a time switch device. By activation of the first trigger device 20 at a predetermined point in time, or upon the attainment of a predetermined tension in the ripcord 12, through the effect of a time delay function, the stabilizing harness 14 is released. In a variant (FIG. 1*b*), in which the control unit 5 is not rigidly attached to the cargo 2 or the cargo handling device 3, the trigger device 21 is triggered together with or time-shifted from the trigger device 20. In this way, the packed cargo parachute with the control unit 5 is separated from the cargo 2 or the cargo-handling device 3. By activation of the second trigger device 40 at an additional predetermined point in time, or upon the attainment of the same, or of an additional, predetermined tension in the ripcord 12, through the effect of an additional time delay function, the fastening device 32 is released, whereby the cargo parachute 6 is released and opens. It is possible to provide an arrangement whereby this also results in the release of the fastening 32 of the packed glide chute to the control box 5, so that the control box hangs from the control box carrying strap, which is pulled out by the effect of the wind. Optionally, it is possible to provide an arrangement whereby, by activation of the second trigger device 40, the fastening of the control box to the cargo 2 or the cargo holding device 3 is released, so that the cargo 2 or the cargo holding device 3 hangs from the additional hanging device 70 under the control box or control unit. Alternatively, the cargo drop system 1 can include a trigger device for release of the cargo parachute 6 and the control box 7 which maintains a data connection with the navigation and guidance system or the mission planning system and with a time switch device, which, at a predetermined point in time, by activation of the trigger device, releases the fastening of the packed glide chute to the control box, so that the control box 7 hangs from the control box carrying strap, which is pulled out by the effect of the wind, and releases the fastening of the control box to the cargo holding device, so that the cargo holding device hangs from the cargo holding device carrying straps, which are pulled out by the effect of the wind. The trigger device can then include only one fastening device, which serves for both the control box 7 and the cargo glide chute 6.

The times for activation of the first trigger device 20 (and the additional trigger device 21, if present) and the second trigger device 40 for the control box 7 can be identical with the time for activation of the trigger device for the cargo glide chute 6. In this case, as in the case where these times are different, the time or times for activation of the trigger device for the control box 5 and the cargo glide chute 6 can be determined according to the drop time of the cargo drop system 1 from the aircraft, plus a predetermined time interval. The time for activation of the second trigger device 40 can also be determined according to the trigger time for the stabilization harness 14, plus a predetermined time interval. In this connection, a predetermined time interval can be stipulated. Moreover, the trigger times for the trigger devices 20, 21 (if present) and 40 can be determined by the navigation and guidance system, whereby external sensors, such as, for example, air data sensors, can also be used. In addition, an absolute time, which is determined by an external signal source or can be programmed into the system, can also be used.

The cargo 2 or the cargo-handling device 3, during or following the opening of the cargo parachute 6, hangs therefrom by means of a hanging device 60. When a control unit 5 is present, this hangs from the cargo parachute 6 by means of the hanging device 60 shown in FIGS. 9*a*–9*b*, whereby the control unit can be connected, in a fixed or rigid manner, to the cargo 2 or the cargo handling device 3, or the cargo 2 or the cargo handling device 3 can hang from the control unit 5 by means of an additional hanging device 70.

Figure 10:
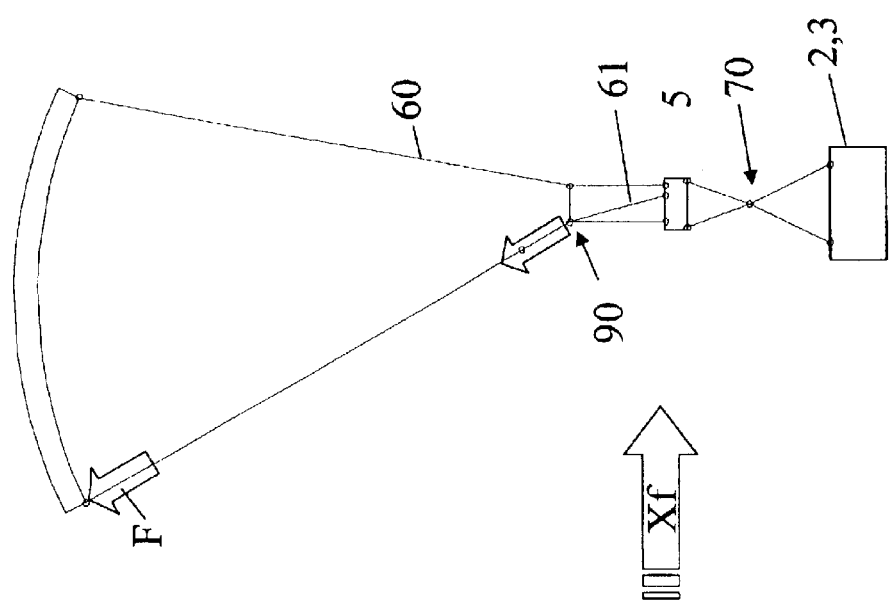
FIG. 10 illustrates the cargo drop system as shown in FIG. 1b and/or FIG. 7b in an additional phase, in which the opening actuator is activated, so that the cargo parachute is brought from the filling position into the glide position.

The hanging device 60, which, for example, includes lines 61 and 62 which run out of the cargo parachute 6, can include a dead loop 65 in one of the lines, which can be released by means of a third trigger device 90 (FIG. 10), whereby the corresponding line is lengthened. By means of the not yet released loop 65, one of the lines 61, 62 is shortened relative to the length of the corresponding line which occurs when the loop is released. The corresponding shortened line accomplishes a stronger curvature of the cargo parachute 6 on the side to which the respective line is connected, whereby a better falling position is achieved. The activation of the trigger device 90 takes place at a predetermined time, or at a predetermined interval after the attainment of a predetermined tension on the corresponding line, which corresponds to a predetermined time after the opening of the cargo parachute. This ensures that the billing position of the cargo parachute 6 is maintained for a predetermined time. Following the activation of the trigger device 90, through the release of the loop 65 and the thereby accomplished lengthening of the corresponding line 61, the shape of the cargo parachute 6 is transformed from the filling position into the flight position.

The third trigger device is optional and can be configured as described in connection with the first trigger device 20. The release of the loop 65 takes place following activation of the second trigger device 40, and preferably in the time interval between 8 and 14 seconds after the attainment of the predetermined tension in the corresponding line of the hanging device 60, during the opening of the cargo parachute 6.

The additional hanging device 70 can coexist with a suitable set of sensors and a drive device of the control unit 5, in order to perform a flare maneuver upon landing. The additional hanging device 70 can be dispensed with, when the control unit 5 is rigidly attached to the cargo 2 or the cargo holding device 3, and the flare actuation depends upon the relative lift of the parachute from the control unit 5.

Figure 2B:
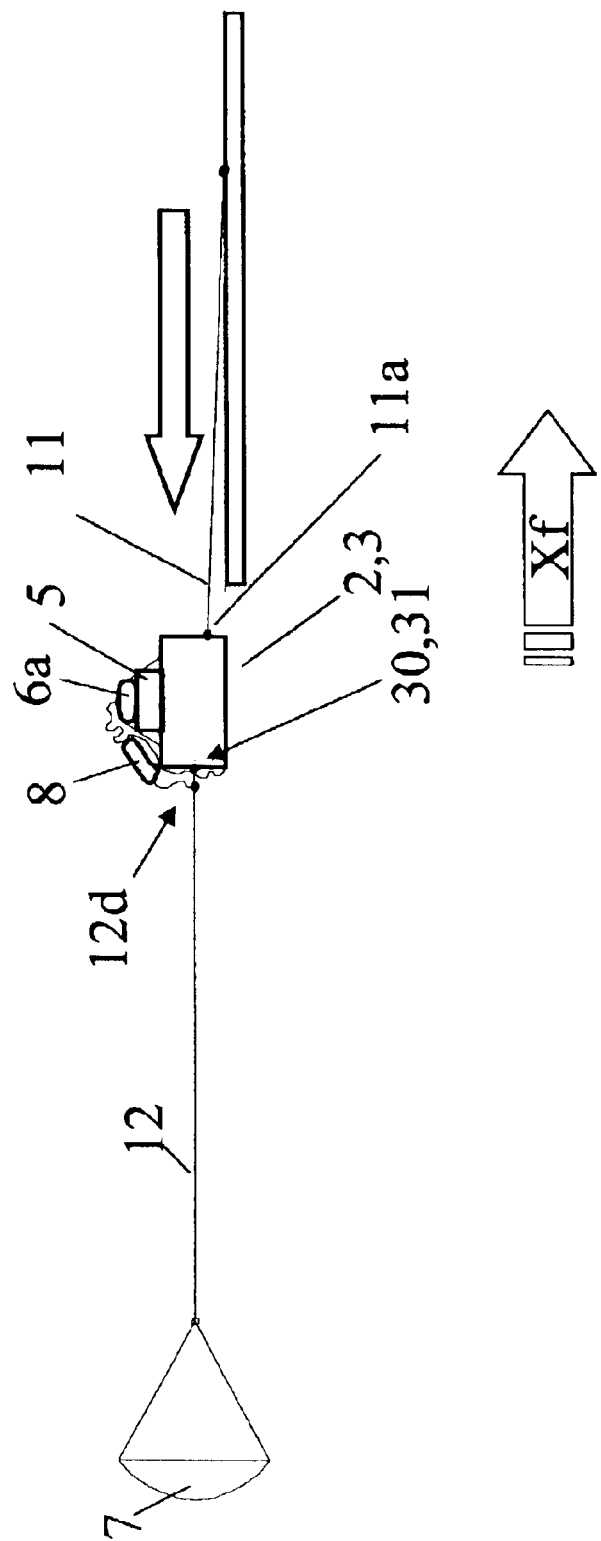
FIG. 2b shows the cargo drop system as shown in FIG. 1b, just after the drop from the aircraft, whereby the first auxiliary parachute is already open and an uncoupling device, for the release of the second auxiliary parachute and the stabilization harness by means of an uncoupling line, is not yet activated.

Prior to the drop, the cargo drop system 1 according to the invention is located in the fuselage, or in a cargo bay, of an aircraft, which is opened in a certain location, in order to remove the cargo to be dropped, or the cargo drop system 1, from the aircraft. As a general rule, in so doing, the auxiliary parachute or the first auxiliary parachute 7 is thrown out of the aircraft before the cargo 3. FIGS. 1a and 1b represent the phase prior to the drop of the cargo 2 from the aircraft; FIGS. 2a and 2b show the phase immediately after the drop, in which the cargo is still connected to part of the aircraft usage, by means of the unlocking line 11.

After the drop, the auxiliary parachute 7 (FIG. 2a) or the first auxiliary parachute 7 opens. The length of the ripcord 12 from the auxiliary parachute 72 the uncoupling device 30 (FIG. 2a or 2b), as well as the length of the unlocking line 11, are dimensioned so that the cargo, in a predetermined and advantageous manner, falls into the wind after leaving the aircraft (FIGS. 2a and 2b). In cases where an uncoupling line 11 is provided in cooperation with an uncoupling device 30, the uncoupling device 30 unlocks the connecting member 12d when a predetermined tension occurs on the uncoupling line 11 or the ripcord 12c. This is compulsory in the three-stage design of the cargo drop system 1, and optional and preferable in the two-stage design (FIGS. 1a, 2a, 3a).

In the three-stage design, upon the opening of the uncoupling device 30, the additional auxiliary parachute 8, or braking chute, is pulled away by the ripcord 12 from the cargo 2 and into the wind, whereby the additional auxiliary parachute 8 is opened as a result of the air stream. To this end, it can be provided that the first auxiliary parachute, or drogue chute, 7 pulls away a packing sleeve 7b from the auxiliary parachute, or the stabilizing or braking chute, 8, so that the latter chute can unfold. The cargo 2, by means of the stabilizing harness 14, is stabilized in its spatial position relative to the direction of the ripcord 12.

In the two-stage design with an uncoupling device 30, the auxiliary or stabilizing parachute 7 is first thrown into the air stream. The aerodynamic forces give rise to the attainment of the predetermined tension in the ripcord 12, in order to open the uncoupling device 30. By opening the uncoupling device 30, the uncoupling line 11 is released from the cargo 2 or the cargo handling device 3, and the partial piece 12a of the ripcord 12, and thereby the stabilization harness 14, are brought to a taut condition. Thereby, the cargo 2 is kept in a predetermined position, relative to the taut ripcord 12 (FIG. 3a).

The uncoupling line 11, following the opening of the uncoupling device 30, preferably remains on the aircraft. Alternatively, however, an additional uncoupling mechanism can be provided on the aircraft, whereby the opening of said additional uncoupling mechanism, simultaneously with the opening of the uncoupling device 30, causes the uncoupling line to be released from the aircraft and carried along by the cargo drop system 1.

Figure 5A:
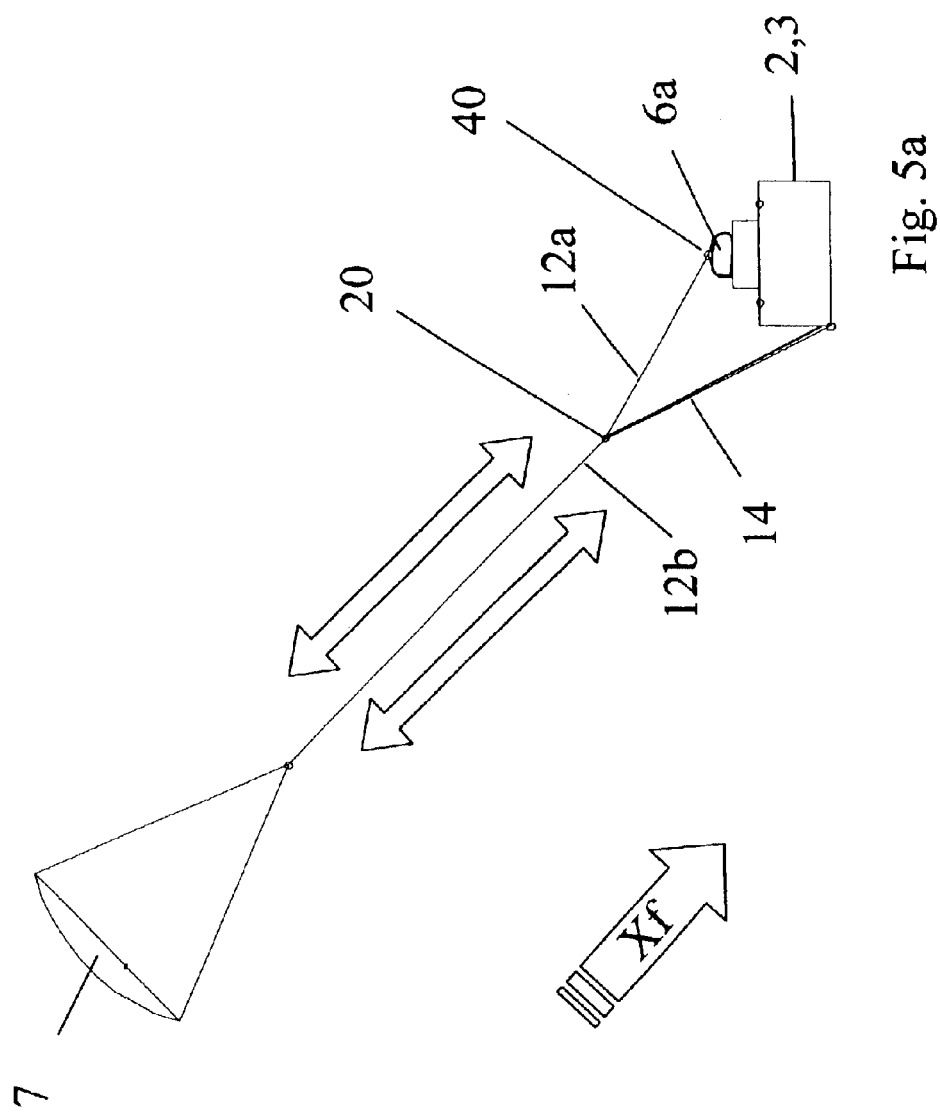
FIG. 5a shows the cargo drop system as shown in FIG. 1a in a phase in which the auxiliary parachute is open and the stabilization harness stabilizes the cargo.

Following the opening of the auxiliary parachute, or the stabilizing or braking chute, 7, or the additional auxiliary parachute 8, the air speed of the cargo is reduced. If the cargo drop system 1 is in the first flight phase shown in FIG. 3a or 3b, in which the auxiliary parachute is connected to the extended ripcord 12 with the still-packed cargo parachute 6a, and the stabilization lines 14a, 14b are still fastened to the fastening means or the fastening point 19 on the ripcord strap 12, and to the fastening points 16a, 16b on the cargo 2 or the cargo holding device 3, the stabilization lines 14a, 14b ensure a stable positioning of the cargo holding device in the air. In the flight direction XF, the auxiliary parachute offers a greater wind resistance than the cargo holding device 3, so that the position of the extended ripcord strap 12 lies in a predetermined, narrow range of positions, whereas the section 12b of the ripcord strap and the length of at least one stabilization line 14, 14a, 14b determine the position of the cargo holding device 3 in space. FIGS. 5a and 5b show the cargo drop system 1, at a speed slowed by the air resistance, in which the ripcord 12 already shows a tendency toward the horizontal, and the cargo 2, due to the dimensioning of the stabilization harness 14, is still in a horizontal position.

In order to release the stabilization harness 14 or the stabilization lines 14a, 14b from the ripcord 12 and/or from the cargo 2 or the cargo holding device 3, the trigger device 20 is activated; said trigger device 20, for example, can be located at the connection point 18 or 18a, 18b, or at the connection points 14a, 14b, or between them on the stabilization lines. The length of the stabilization harness 14 is preferably set in such a way that the angle of incidence of the cargo drop system 1, that is, the angle between the course of the extended ripcord 12 and the horizontal, is between 40 and 60 degrees.

In FIGS. 6a and 7a, or 6b and 7b, the cargo drop system 1 is in a second flight phase, after the removal of the stabilization lines 14. The removal of the stabilization lines 14 takes place at a point in time where the cargo drop system 1 has been slowed down by the air resistance. Accordingly, the extended ripcord strap 12 is less flat or steeper in the air than in the position shown in FIG. 4a or 4b. Through the removal of the stabilization lines 14, the position of the cargo 2 or the cargo holding device 3, relative to the ripcord strap 12, is modified. By comparison to the basic position of the cargo handling device, which it had assumed a few seconds earlier, the change in position of the cargo handling device 3 is significantly less than the change in position of the extended ripcord 12 (cf. FIGS. 3a, 3b and 6a, 6b). In this way, it is possible to avoid an unfavorable—that is, too sharply tilted—position of the cargo 2 or the cargo-handling device 3, relative to a nominal position thereof.

The auxiliary parachute or braking chute 8 holds the cargo 2, preferably by means of a three-point hanging arrangement, by means of the ripcord 12 and the stabilization harness 14. This takes place, as stated above, through the opening of the uncoupling device 30. Subsequently, the ripcord 12 pulls on its point of contact with the cargo 2, which, in the designs shown, is located on top of the cargo 2 or the cargo holding device 3. The braking force thereby exerted on the point of contact of the ripcord 12 gives rise to a turning moment in the cargo 2 and causes it to turn, until the stabilization harness 14 becomes tension-loaded. The auxiliary parachute 7 and/or 8 reduces the fall speed of the cargo drop system 1, whereas the ripcord 12, together with the stabilization harness 14, reduces the oscillation of the cargo 2, until the cargo 2 has assumed a speed-reduced, stable flight position.

In the flight phases shown in FIGS. 5a and 5b, the first trigger device 20, the additional trigger device 21 (if present), and the second trigger device 40 are initiated or activated. This preferably takes place when both trigger devices 20 (with 21, if present) and 40 are simultaneously actuated or initiated, preferably by the attainment of a predetermined tension on the ripcord 12, and are activated at time-shifted intervals by means of time delay devices, whereby the first trigger device 20 is first activated, the additional trigger device 21 (if present) is activated simultaneously with or subsequent to the first trigger device 20, and the second trigger device 40 is then activated.

Figure 8B:
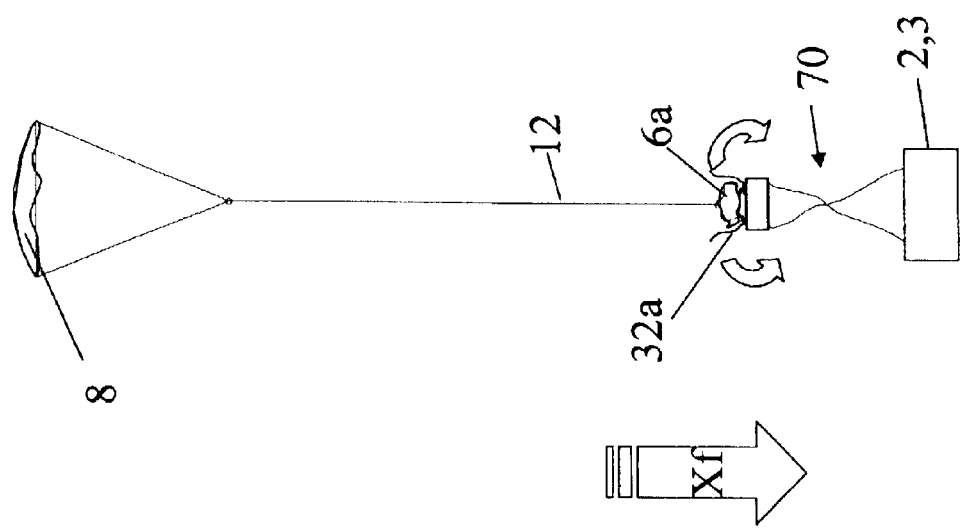
FIG. 8b illustrates the cargo drop system as shown in FIG. 1b and/or FIG. 7b in a design, in which the control unit, following the activation of the first trigger device, is distanced from the cargo by means of a cargo hanging device, and, in an additional phase, in which, through the activation of a second trigger device, the cargo parachute is released from the cargo and is thereby free to open.

FIGS. 7a and/or 7b show the phase in which the first trigger device 20 has already been opened or released, but the second trigger device 40 has not yet been opened or released. The opening of the second trigger device 40 is shown in FIGS. 8*a* and/or 8*b*. The resulting state is shown in FIGS. 9*a* and/or 9*b*. FIG. 9*a* shows a design of the cargo drop system 1 according to the invention, in which the control unit 5 remains on the cargo 2 until landing.

Figure 9B:
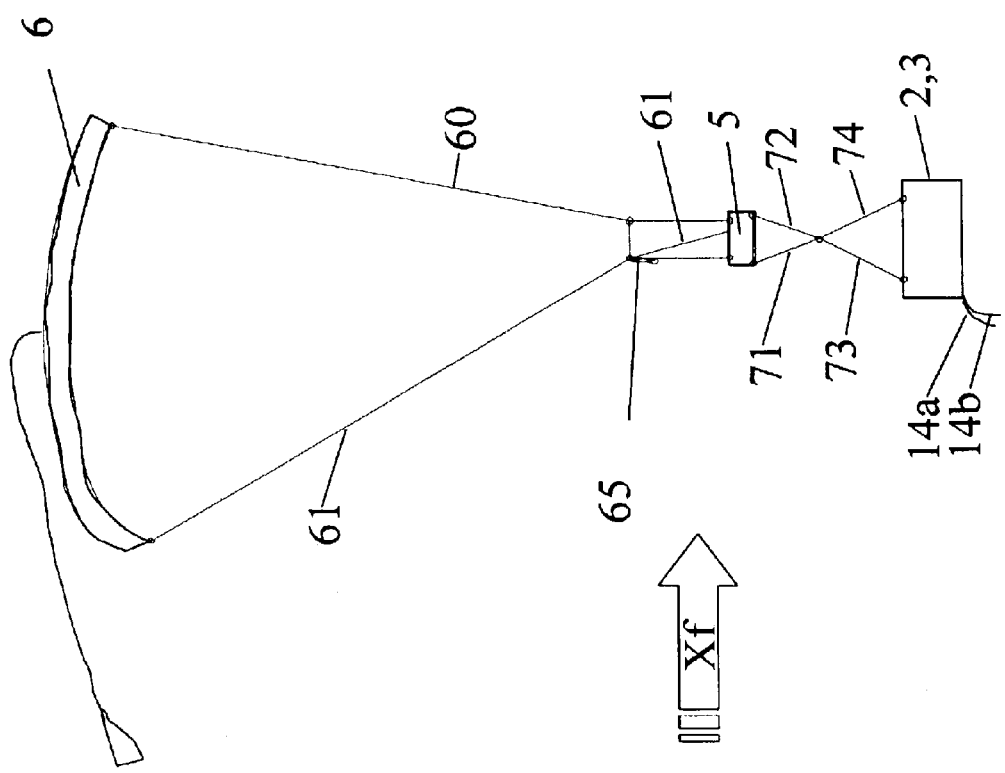
FIG. 9b shows the cargo drop system as shown in FIG. 1b and/or FIG. 7b in an additional phase, in which, through the activation of a second trigger device, the cargo parachute is opened, whereby an opening actuator in the form of a dead loop on the hanging device of the cargo parachute is not yet activated, so that the cargo parachute is in an opening position.

In the design according to FIG. 9*b*, the opening of the first trigger device 20, along with the additional trigger device 21 (if present), releases the additional hanging device 70, so that the control unit 5 is thereby distanced from the cargo 2. Alternatively, this can also take place through the opening of the first trigger device 20. Thereby, a flare is enabled upon landing, by means of suitable control mechanisms and flare devices which are optionally provided in the control unit 5. However, the additional hanging device 70 may also be provided for other reasons, such as the attainment of a favorable landing. The additional hanging device 70 as shown in FIG. 9*b* consists of four hanging lines 71, 72, 73, 74, whereby each pair of hanging lines 71, 72, 73, 74, which run at a distance from each other from the control unit 5, or from the cargo 2 or the cargo holding device 3, are connected between the cargo 2 and the control unit 5. At this place, the two pairs of hanging lines 71, 72 and 73, 74 are also connected to each other. This has the effect of achieving an X-position of the hanging lines 71, 72 and 73, 74, whereby the advantage consists of the fact that the stable flight position is independent of the center of gravity of the cargo 2 or the pressure point of the cargo parachute 6. In this way, the control unit 5 also attains a stable position. Sometime after the attainment of the status set forth in FIG. 7*b*, the second trigger device 40 is activated (for example, upon the attainment of the predetermined tension in the ripcord 12), and the cargo should 6 is released so that it can be opened.

Figure 11A:
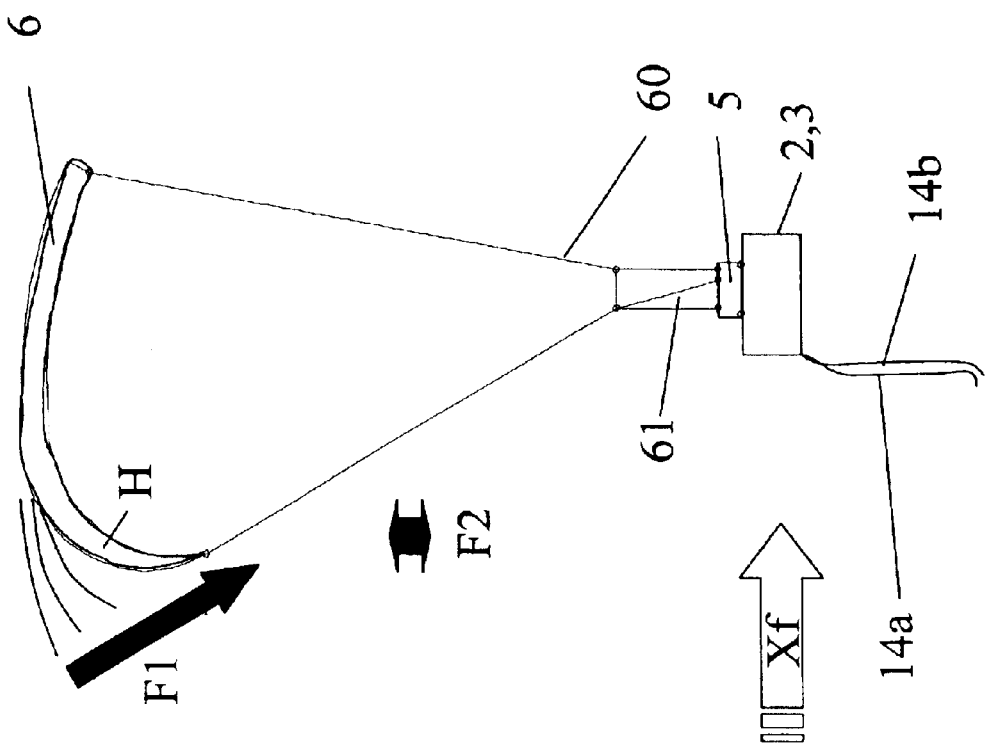
FIG. 11a shows the cargo drop system as shown in FIG. 1a and/or FIG. 7a in an additional phase, in which, prior to landing, through the activation of an actuator, which makes use of the parachute lifting force as the parachute rises, a flare is set off.

FIGS. 9*a* and 11*a* show a design of the cargo drop system 1, in which the control unit 5 remains coupled to the cargo 2 or the cargo holding device 3. The control unit 5 can be configured with or without a flare function and a flare device. FIG. 11*a* shows a design in which the control unit 5 can accomplish a flare maneuver, as shown by the function arrows F1 and F2. In order to activate the flare, a flare hanging line 61 of the hanging device, which can be rolled up onto the control unit 5, is provided, and is connected to the rear edge H (viewed in the flight direction XF) of the cargo parachute 6. In a phase prior to the landing of the cargo 2, the flare hanging line 61 is rolled up in the control unit 5. Thereby, the rear edge H is pulled downward, that is, in the direction of the ground. In order to bring the required attention to the flare hanging line 61, the force of the parachute is used, whereby the parachute-hanging device 60 is released upward. Thereby, the rear edge H is pulled downward. Accordingly, the flare device includes a gravity actuator.

Such a gravity actuator can also be actuated by the sinking of the cargo 2 below the control unit 5, as shown in FIG. 11*b*. In this way, the pair of hanging lines 71, 72 of the hanging device 70 are rolled down between the control unit 5 and the cargo 2 by the gravity actuator (movement F2 in FIG. 11*b*), in order to achieve attention for the activation of the rear edge H with a defined translation ratio.

In a particular design of the invention, the hanging device 60 can also be provided with an opening actuator 65, especially in the form of a dead loop, in order to improve the opening of the cargo parachute 6. The initiation and activation take place by means of a third trigger device 90, which can be configured in various ways. This can be achieved by means of the described mechanism with time delay function, which is activated or initiated as a result of the payment of a predetermined tension in a line of the hanging device 60. However, this can also be implemented by means of electric circuit or a transceiver device, which is controlled from an external location—that is, from outside the cargo drop system 1—or by a control device in the control unit 5.

Figure 12A:
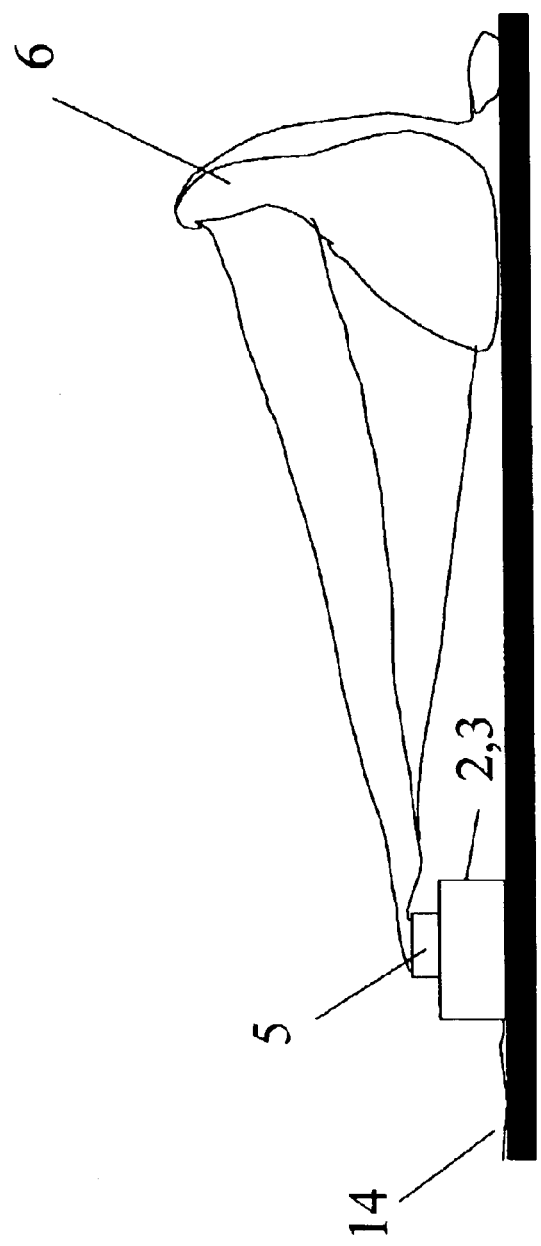
FIG. 12a shows the cargo drop system as shown in FIG. 1a and/or FIG. 7a, following the landing thereof.
Figure 12B:
FIG. 12b shows the cargo drop system as shown in FIG. 1b and/or FIG. 7b, following the landing thereof.

The cargo drop system 1 after landing is shown in FIGS. 12*a* and 12*b*.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A cargo drop system comprising:
   a cargo apparatus;
   a cargo parachute;
   an auxiliary parachute;
   at least one ripcord connecting said auxiliary parachute to said cargo parachute;
   a stabilization harness connected between a first connection point on said at least one ripcord and said cargo apparatus in order to stabilize said cargo apparatus in a predetermined position relative to said ripcord when pulled by aerodynamic forces and to maintain an angle formed by a vertical axis of the cargo apparatus relative to a longitudinal projection of said ripcord, which is pulled by said aerodynamic forces after said cargo apparatus is dropped from an aircraft, said angle being maintained for a predetermined range;
   a first trigger device connected to said stabilization harness for controlling release of said stabilization harness from said ripcord;
   a second trigger device and a hanging device attached to said cargo parachute wherein said second trigger device controls release of said cargo parachute from said cargo apparatus whereby said cargo apparatus hangs from said hanging device.

2. The cargo drop system according to claim 1, wherein each of the first and second trigger devices are actuated by at least one of the attainment of a predetermined tension in the ripcord, and by means of a time delay device.

3. The cargo drop system according to claim 2, wherein the time delay device of the first trigger device is configured in such a way that the release of the stabilization harness takes place within a time interval between 2 and 6 seconds after the attainment of the predetermined tension in the ripcord.

4. The cargo drop system according to claim 2, wherein the time delay device of the second trigger device is configured in such a way that the opening of the cargo parachute takes place within a time interval between 3 and 12 seconds after the attainment of the predetermined tension in the ripcord.

5. The cargo drop system according to claim 1, further including an uncoupling device which cooperates with an uncoupling line connected to a fuselage of an aircraft wherein the uncoupling device connects a second point on the ripcord with the cargo apparatus in a detachable manner, so that said stabilization harness is kept in a slack condition, whereby, by releasing the uncoupling line from the cargo apparatus, the ripcord is released from a fastening point, so that, by means of the aerodynamic forces, the stabilization harness, together with the entire ripcord, can be brought into a taut condition.

6. The cargo drop system according to claim 1, wherein the predetermined range of the angle which is formed by the vertical access of the cargo apparatus relative to the longitudinal projection of the extended ripcord, lies between forty and 60 degrees.

7. The cargo drop system according to claim 1, further including an additional auxiliary parachute arranged between the auxiliary parachute and the cargo apparatus, whereby the auxiliary parachute is uncoupled from the additional auxiliary parachute by means of a nominal separation point in the ripcord, due to the effect of the aerodynamic forces.

8. The cargo drop system according to claim 1, further including a control unit detachably located on the cargo apparatus and an additional trigger device for the release of a fastening device, in order to accomplish the release of the control unit, whereby the cargo apparatus hangs, by means of a hanging apparatus from the control unit.

9. A process for the stabilization of a cargo drop system to be dropped from an aircraft, with a cargo apparatus, a cargo parachute, an auxiliary parachute, and at least one ripcord for connecting the auxiliary parachute to the cargo parachute, comprising the steps of:

dropping said auxiliary parachute from the aircraft, activating a first trigger device in order to bring a stabilization housing connected to the ripcord to a taut condition for the effect of the aerodynamic forces; and activating a second trigger device to release the cargo parachute from the cargo apparatus whereby the cargo apparatus hangs from a hanging device on the cargo parachute.

10. The cargo drop system according to claim 2, further including an uncoupling device which cooperates with an uncoupling line connected to a fuselage of an aircraft wherein the uncoupling device connects a second point on the ripcord with the cargo apparatus in a detachable manner, so that said stabilization harness is kept in a slack condition, whereby, by releasing the uncoupling line from the cargo apparatus, the ripcord is released from a fastening point, so that, by means of the aerodynamic forces, the stabilization harness, together with the entire ripcord, can be brought into a taut condition.

11. The cargo drop system according to claim 3, further including an uncoupling device which cooperates with an uncoupling line connected to a fuselage of an aircraft wherein the uncoupling device connects a second point on the ripcord with the cargo apparatus in a detachable manner, so that said stabilization harness is kept in a slack condition, whereby, by releasing the uncoupling line from the cargo apparatus, the ripcord is released from a fastening point, so that, by means of the aerodynamic forces, the stabilization harness, together with the entire ripcord, can be brought into a taut condition.

12. The cargo drop system according to claim 4, further including an uncoupling device which cooperates with an uncoupling line connected to a fuselage of an aircraft wherein the uncoupling device connects a second point on the ripcord with the cargo apparatus in a detachable manner, so that said stabilization harness is kept in a slack condition, whereby, by releasing the uncoupling line from the cargo apparatus, the ripcord is released from a fastening point, so that, by means of the aerodynamic forces, the stabilization harness, together with the entire ripcord, can be brought into a taut condition.

13. The cargo drop system according to claim 2, wherein the predetermined range of the angle which is formed by the vertical access of the cargo apparatus relative to the longitudinal projection of the extended ripcord, lies between forty and 60 degrees.

14. The cargo drop system according to claim 3, wherein the predetermined range of the angle which is formed by the vertical access of the cargo apparatus relative to the longitudinal projection of the extended ripcord, lies between forty and 60 degrees.

15. The cargo drop system according to claim 4, wherein the predetermined range of the angle which is formed by the vertical access of the cargo apparatus relative to the longitudinal projection of the extended ripcord, lies between forty and 60 degrees.

16. The cargo drop system according to claim 5, wherein the predetermined range of the angle which is formed by the vertical access of the cargo apparatus relative to the longitudinal projection of the extended ripcord, lies between forty and 60 degrees.

17. The cargo drop system according to claim 3, wherein the time delay device of the second trigger device is configured in such a way that the opening of the cargo parachute takes place within a time interval between 3 and 12 seconds after the attainment of the predetermined tension in the ripcord.

18. The cargo drop system according to claim 2, further including an additional auxiliary parachute arranged between the auxiliary parachute and the cargo apparatus, whereby the auxiliary parachute is uncoupled from the additional auxiliary parachute by means of a nominal separation point in the ripcord, due to the effect of the aerodynamic forces.

19. The cargo drop system according to claim 3, further including an additional auxiliary parachute arranged between the auxiliary parachute and the cargo apparatus, whereby the auxiliary parachute is uncoupled from the additional auxiliary parachute by means of a nominal separation point in the ripcord, due to the effect of the aerodynamic forces.

20. The cargo drop system according to claim 2, further including a control unit detachably located on the cargo apparatus and an additional trigger device for the release of a fastening device, in order to accomplish the release of the control unit, whereby the cargo apparatus hangs, by means of a hanging apparatus from the control unit.

* * * * *